United States Patent [19]

Hageman

[11] Patent Number: 4,925,494

[45] Date of Patent: May 15, 1990

[54] FLAME RETARDANT ASPHALT COATING

[76] Inventor: John P. Hageman, 42 Susan Dr., Closter, N.J.

[21] Appl. No.: 276,517

[22] Filed: Nov. 28, 1988

[51] Int. Cl.$^5$ .............................................. C08L 95/00
[52] U.S. Cl. .................... 106/280; 106/281.1; 106/284; 106/18.11; 106/18.26; 252/606
[58] Field of Search ...................... 106/280, 281.1, 284, 106/18.11, 18.26; 252/606

[56] References Cited

U.S. PATENT DOCUMENTS

| | | | |
|---|---|---|---|
| 2,128,392 | 5/1937 | Albion | 106/18.11 |
| 2,310,343 | 2/1943 | Barab | 106/18.11 |
| 2,322,781 | 1/1943 | Hanks | 106/18.11 |
| 2,569,399 | 9/1951 | Burns et al. | 106/18.11 |
| 2,734,827 | 2/1956 | Hooks | 106/18.11 |
| 3,201,265 | 8/1965 | Hodnefield | 106/18.11 |
| 3,313,636 | 4/1967 | Blair et al. | 106/272 |
| 3,342,614 | 9/1967 | Koons | 106/273.1 |

*Primary Examiner*—Prince E. Willis
*Assistant Examiner*—Helene Klemanski
*Attorney, Agent, or Firm*—Salzman & Levy

[57] ABSTRACT

The invention features an additive for a mastic coating comprising a cut-back asphaltic base material used in roof and construction applications. The additive comprising sodium bicarbonate in a range by weight of 1 part per 2–8 parts of the cut-back, asphaltic-type base material, has the dual purpose of accelerating the curing time and improving flame retardancy of the mastic coating.

17 Claims, No Drawings

FLAME RETARDANT ASPHALT COATING

FIELD OF THE INVENTION

The invention relates to mastic coatings for roofing and highway construction, and more particularly to a flame retardant asphalt coating for built-up-roofing applications.

BACKGROUND OF THE INVENTION

Cut-back asphalts are in current use as mastic coatings for highway construction and built-up-roofing (BUR) applications. Such cut-back asphalts are usually prepared by adding mineral spirits (naphtha) to an asphaltic base.

Used as a mastic coating for insulating and weatherproofing roof membranes, these cut-back asphalts have several advantages, one of which is the ease of application. They are usually mopped or sprayed in a cold (ambient) state over roof membranes, and then allowed to dry. An additional layer of granules or gravel can be applied over the mastic-coated membrane to provide protection from heat and ultraviolet radiation, as taught in U.S. Pat. No. 4,521,478; issued: June 4, 1985 to John P. Hageman.

While cut-back asphalts have gained commercial acceptance in roofing applications and construction, they have not achieved their complete potential due to several drawbacks and disadvantages, such as:

1. Cut-back asphalts remain tacky from 3 to 4 weeks after application, causing considerable delays in completion of the construction project. Roofs cannot be walked upon and inspected until the asphalt is dry.
2. Cut-back asphalts present a dangerous fire hazard because of their highly flammable nature. Cut-back asphalts have a low flash point of approximately 50 degrees F. (open cup).

In order to decrease the flammability of the asphalt, flame retardant fillers such as asbestos have been utilized. However, asbestos has been coming into increasing disrepute as a carcinogen, and its use in the building trades is on the wane. In addition, asbestos does nothing to improve the drying characteristics of the asphalt, and is also a fairly expensive component.

The invention seeks to provide an asphalt additive which retards flammability, and is inexpensive.

The invention also has as one of its objectives to provide an additive which will decrease the drying time of the mastic coat.

SUMMARY OF THE INVENTION

The invention features an additive for a mastic coating, which has flame retardant capabilities. Mastic coatings which are the concern of this invention comprise a base of asphalt, coal tar or bitumen that is made more liquifiable and free-flowing by fluxing with suitable distillates, such as mineral spirits (naphtha).

The mastic coating of the invention generally features the cut-back asphaltic base combined with a sodium bicarbonate (bicarbonate of soda) additive in a range of ratios of between 8:1 and 2:1 parts by weight.

The sodium bicarbonate (NaHCO) when mixed with a cut-back asphalt produces a mastic coating with excellent flame retardancy.

In addition, the use of the sodium bicarbonate accelerates the curing time of the coating, such that the mastic will dry in approximately $\frac{1}{4}$ to $\frac{1}{3}$ of the normal curing time.

One other unexpected result of using this additive is its ability to make the cut-back asphalt thixotropic in the uncured state, i.e., the coating fills-in depressions in the roof surface when it is wet, and upon drying provides a more level and uniform coated surface.

In addition to the sodium bicarbonate, the flame retardant additive may also comprise between 5% and 15% antimony trioxide by weight.

DETAILED DESCRIPTION OF THE PREFERRED EMBODIMENT

Generally speaking, the invention pertains to mastic coatings for use in highway and roofing construction. The mastic coating comprises an asphaltic base, which can contain either asphalt, coat tar or bitumen that has been cut-back with appropriate distillates, such as mineral spirits (naphtha).

Mastic coatings of the type mentioned herein can be purchased from the Karnak Chemical Company of Clark, New Jersey; Tremco of Cleveland, Ohio; and Gardner Asphalt Company of Hoboken, N.J. to name a few.

In their commercial state, such mastic coatings are highly flammable, and provide appropriate warnings of the fire hazard when purchased.

The invention seeks to reduce the flammability of the mastic coatings by the addition of powdered sodium bicarbonate (NaHCO). The sodium bicarbonate is purchased in commercial or U.S.P. grade from any one of a number of companies, such as: Fluka Chemical Corporation of Ronkonkoma, New York; or Church and Dwight Company, Incorporated of New York, N.Y.

The powdered sodium bicarbonate is added in a range of ratios from 1 gallon (8 lbs) of mastic to 1 lb of NaHCO; and $\frac{1}{4}$ gallon (2 lbs) of mastic to 1 lb of NaHCO.

The sodium bicarbonate is added to the mastic and blended therewith by stirring for approximately 10 to 15 minutes at a low speed of 5 to 10 r.p.m. in an appropriate sized vat.

The mastic mixture is then spray or mop coated over a roof membrane or other suitable surface and allowed to dry.

Normally, the mastic has a drying time of approximately 3 to 4 weeks before it can be inspected or walked upon.

One of the unexpected results of using the sodium bicarbonate as a flame retardant in admixture, was the discovery that the curing time of the coating was accelerated, such that a typical coating layer cured in approximately 5 to 7 days.

Another unexpected result of the aforementioned admixture was the observation that the coating developed a thixotropic character when spread upon the work surface. The admixture was noticed to fill-in the depressions and void areas, thus providing a more uniform and even surface.

EXAMPLE 1

To a gallon of cut-back, asbestos filled asphalt, 1 pound of powdered sodium bicarbonate was added. The mixture was stirred for 15 minutes at 10 r.p.m. to provide a uniform blend. The admixture was then coated upon a roof surface and allowed to cure for 1 week.

When the admixture was dry, the coated surface was uniformly heated to incandescency by a blow torch for several minutes.

It was observed that the mastic coating did not burn, and a red hot, intumescent layer was formed on the surface of the coating. Also observed was the release of carbon dioxide which bubbled the asphalt into the aforementioned intumescent (char) layer. The release of the carbon dioxide quickly extinguished any flames before they could spread over the surface of the coating.

EXAMPLE 2

The experiment of Example 1 was repeated using an admixture of 1 gallon of cut-back asphalt to 2 pounds of powdered sodium bicarbonate.

The same result was observed upon torching the cured coating with the further observation of an enhanced ability to extinguish the spread of the flames.

EXAMPLE 3

The experiment of Example 2 was repeated using an admixture of I gallon of cut-back asphalt and between 3 to 4 lbs of powdered sodium bicarbonate.

The same results were observed with a still greater enhancement of the flame retardancy characteristic.

It is contemplated by this invention that the sodium bicarbonate can be used as a supplemental filler to improve the flame retardancy of asbestos filled, cut-back asphalt, or preferably as an additive without the use of asbestos.

It is further contemplated that small amounts of antimony trioxide, of approximately between 5% to 15% by weight be additionally added to the admixture.

Since other modificatons and changes varies to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described this invention, what is desired to be protected by Letters patent is presented by the following appended claims.

What is claimed is:

1. An additive for a mastic coating material useful in roofing and construction, comprising a cut-back, asphaltic-type base, said additive having the dual purpose of providing both an acceleration of curing time and flame retardancy for said mastic coating material, said additive comprising sodium bicarbonate which is added to said mastic coating material in a range of ratios from approximately between 1:8 to about 1: parts by weight.

2. The additive of claim 1, wherein said sodium bicarbonate is added in a ratio of approximately 3:8 parts by weight.

3. The additive of claim 1, further comprising approximately between 5 and 15% by weight, antimony trioxide.

4. The additive of claim 2, further comprising approximately between 5 and 15% by weight, antimony trioxide.

5. The additive of claim 1, wherein said cut-back, asphaltic-type base contains asbestos.

6. The additive of claim 1, wherein said cut-back, asphaltic-type base is asbestos free.

7. The additive of claim 1, wherein said cut-back asphaltic-type base is selected from a group consisting of: asphalt, coal tar and bitumen.

8. In combination, a mastic coating comprising:
   between 2 and 8 parts by weight of a cut-back, asphaltic-type base material; and
   approximately 1 part by weight of sodium bicarbonate.

9. The mastic coating of claim 8, further comprising approximately between 5 and 15% by weight, antimony trioxide.

10. The mastic coating of claim 8, wherein said cut-back asphaltic-type base material is selected from a group consisting of: asphalt, coal tar and bitumen.

11. The mastic coating of claim 8, wherein said cut-back asphaltic-type base material contains asbestos.

12. The mastic coating of claim 8, wherein said cut-back, asphaltic-type base material is asbestos free.

13. A method of accelerating the curing time and improving the flame retardancy of a cut-back asphaltic-type base material utilized as a mastic coating in roofing and construction applications, comprising the step of:
   adding approximately 1 part by weight, sodium bicarbonate to between 2 and 8 parts by weight of said asphaltic-type base material.

14. The method of claim 13, further comprising the step of adding approximately between 5 and 15% by weight, antimony trioxide to further improve the flame retardancy.

15. The method of claim 13, wherein said cut-back, asphaltic-type base material is selected from a group consisting of: asphalt, coal tar and bitumen.

16. The method of claim 13, wherein said cut-back asphaltic-type base material contains asbestos.

17. The method of claim 13, wherein said cut-back asphaltic-type base material is asbestos free.

* * * * *